United States Patent
Raghunathan

(10) Patent No.: US 9,472,219 B1
(45) Date of Patent: Oct. 18, 2016

(54) DATA STORAGE DEVICE CALIBRATING PARAMETER FOR HEAT ASSISTED MAGNETIC RECORDING

(71) Applicant: Western Digital Technologies, Inc., Irvine, CA (US)

(72) Inventor: Aravind Raghunathan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/736,860

(22) Filed: Jun. 11, 2015

Related U.S. Application Data

(60) Provisional application No. 62/156,136, filed on May 1, 2015.

(51) Int. Cl.
| | | |
|---|---|---|
| *G11B 11/00* | (2006.01) | |
| *G11B 13/04* | (2006.01) | |
| *G11B 5/48* | (2006.01) | |
| *G11B 20/10* | (2006.01) | |
| *G11B 5/60* | (2006.01) | |
| *G11B 5/00* | (2006.01) | |

(52) U.S. Cl.
CPC .......... *G11B 5/4866* (2013.01); *G11B 5/6011* (2013.01); *G11B 5/6029* (2013.01); *G11B 5/6076* (2013.01); *G11B 20/10388* (2013.01); *G11B 2005/0021* (2013.01)

(58) Field of Classification Search
CPC .......... G11B 2005/0021; G11B 5/607; G11B 5/6076; G11B 7/1267; G11B 13/04; G11B 2005/001; G11B 5/02; G11B 5/455; G11B 5/6029; G11B 5/6064; G11B 2007/0013; G11B 21/003; G11B 5/6011
See application file for complete search history.

(56) References Cited

U.S. PATENT DOCUMENTS

| | | | |
|---|---|---|---|
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |

(Continued)

OTHER PUBLICATIONS

Phillip Scott Haralson, et al., U.S. Appl. No. 14/754,340, filed Jun. 29, 2015, 32 pages.

(Continued)

*Primary Examiner* — Dionne H Pendleton

(57) ABSTRACT

A data storage device is disclosed comprising a head actuated over a disk, wherein the head comprises a laser configured to heat the disk while writing data to the disk. A write power for the laser is calibrated, wherein the write power is applied to the laser while writing user data to the disk. A calibration power is applied to the laser for a first interval, wherein the calibration power is high enough to cause the head to contact the disk if applied for a second interval longer than the first interval. While applying the calibration power to the laser, test data is written to the disk during at least part of the first interval. The test data is read from the disk to generate a read signal, and a metric is generated based on the read signal.

14 Claims, 4 Drawing Sheets

(56) References Cited

U.S. PATENT DOCUMENTS

| | | |
|---|---|---|
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,260 B2 | 9/2005 | Coffey et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,975,472 B2 | 12/2005 | Stover et al. |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |

(56) References Cited

U.S. PATENT DOCUMENTS

| | | |
|---|---|---|
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,242 B1 | 4/2006 | Terrill et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,097 B2 | 8/2006 | Hamaguchi et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,647 B2 | 8/2011 | Lille |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |

(56) References Cited

U.S. PATENT DOCUMENTS

| | | |
|---|---|---|
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,643 B2 | 6/2013 | Prabhakaran et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,743,667 B1 | 6/2014 | Brockie et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,897,104 B1 | 11/2014 | Yan et al. |
| 8,902,718 B1 | 12/2014 | Ruan et al. |
| 8,976,633 B1 | 3/2015 | Ruan et al. |
| 2007/0230012 A1 | 10/2007 | Erden et al. |
| 2007/0291401 A1* | 12/2007 | Sun .................. G11B 5/596 360/75 |
| 2009/0113702 A1 | 5/2009 | Hogg |
| 2009/0207519 A1 | 8/2009 | Erden et al. |
| 2010/0123967 A1 | 5/2010 | Batra et al. |
| 2010/0306551 A1 | 12/2010 | Meyer et al. |
| 2011/0188361 A1* | 8/2011 | Fuse .................. G11B 7/1267 369/47.51 |
| 2011/0205861 A1* | 8/2011 | Erden .................. G11B 5/02 369/13.27 |
| 2011/0226729 A1 | 9/2011 | Hogg |
| 2011/0228652 A1* | 9/2011 | Gage .................. G11B 5/314 369/13.26 |
| 2012/0159042 A1 | 6/2012 | Lott et al. |
| 2012/0275050 A1 | 11/2012 | Wilson et al. |

(56) References Cited

U.S. PATENT DOCUMENTS

2012/0281963 A1 11/2012 Krapf et al.
2012/0324980 A1 12/2012 Nguyen et al.
2013/0094104 A1 4/2013 Ngan et al.

OTHER PUBLICATIONS

Galvin T. Chia, et al., U.S. Appl. No. 14/483,397, filed Sep. 11, 2014, 21 pages.

* cited by examiner

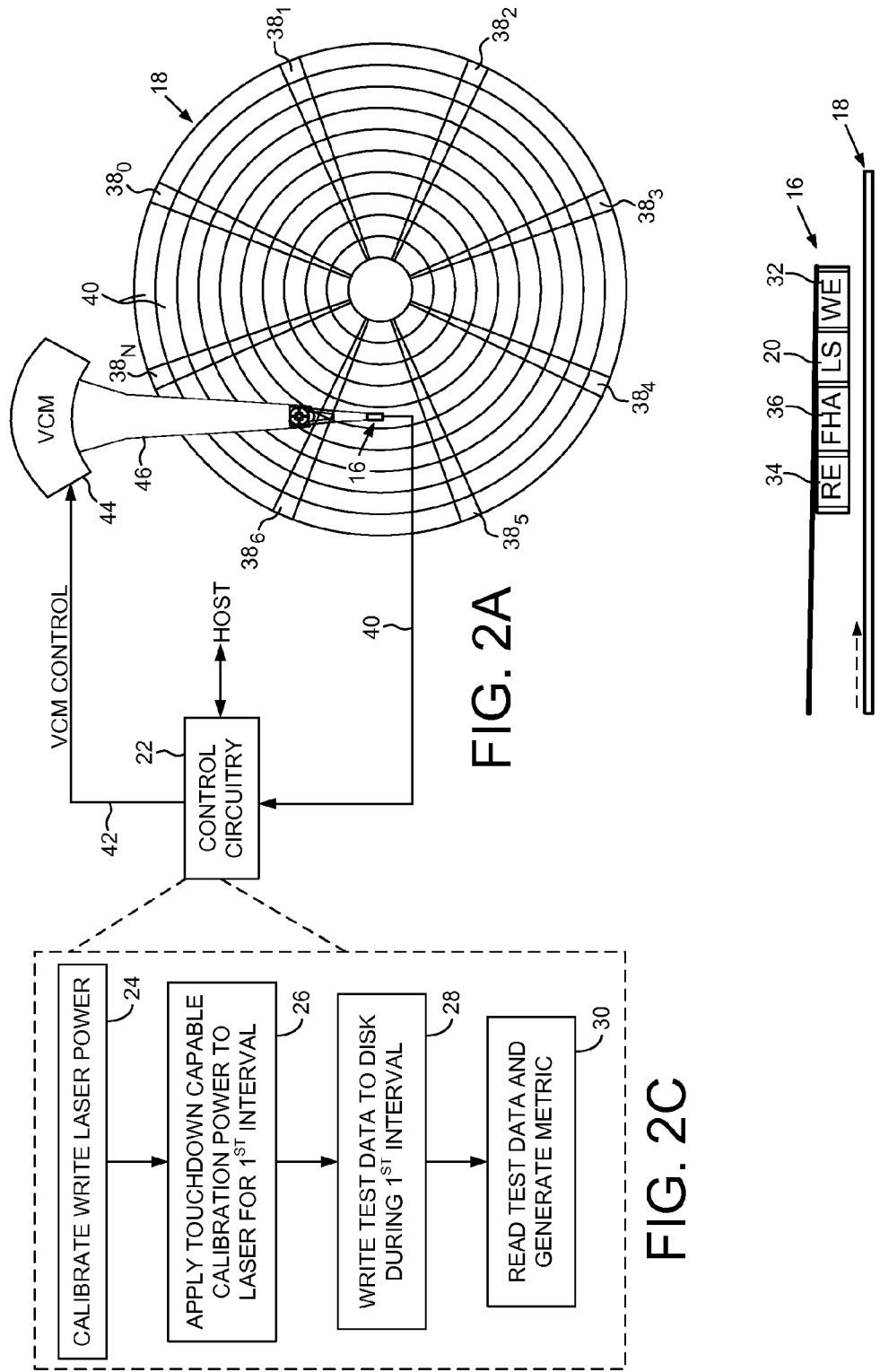

DATA STORAGE DEVICE CALIBRATING PARAMETER FOR HEAT ASSISTED MAGNETIC RECORDING

CROSS-REFERENCE TO RELATED APPLICATIONS

This application claims priority to provisional U.S. Patent Application Ser. No. 62/156,136, filed on May 1, 2015, which is hereby incorporated by reference in its entirety.

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B shows a head according to an embodiment comprising a laser configured to heat the disk while writing data to the disk and a fly height actuator configured to actuate the head vertically over the disk.

FIG. 2C is a flow diagram according to an embodiment wherein during a calibration procedure a touchdown capable calibration power is applied to the laser for a first interval too short to cause the head to contact the disk.

DETAILED DESCRIPTION

Figure 1:
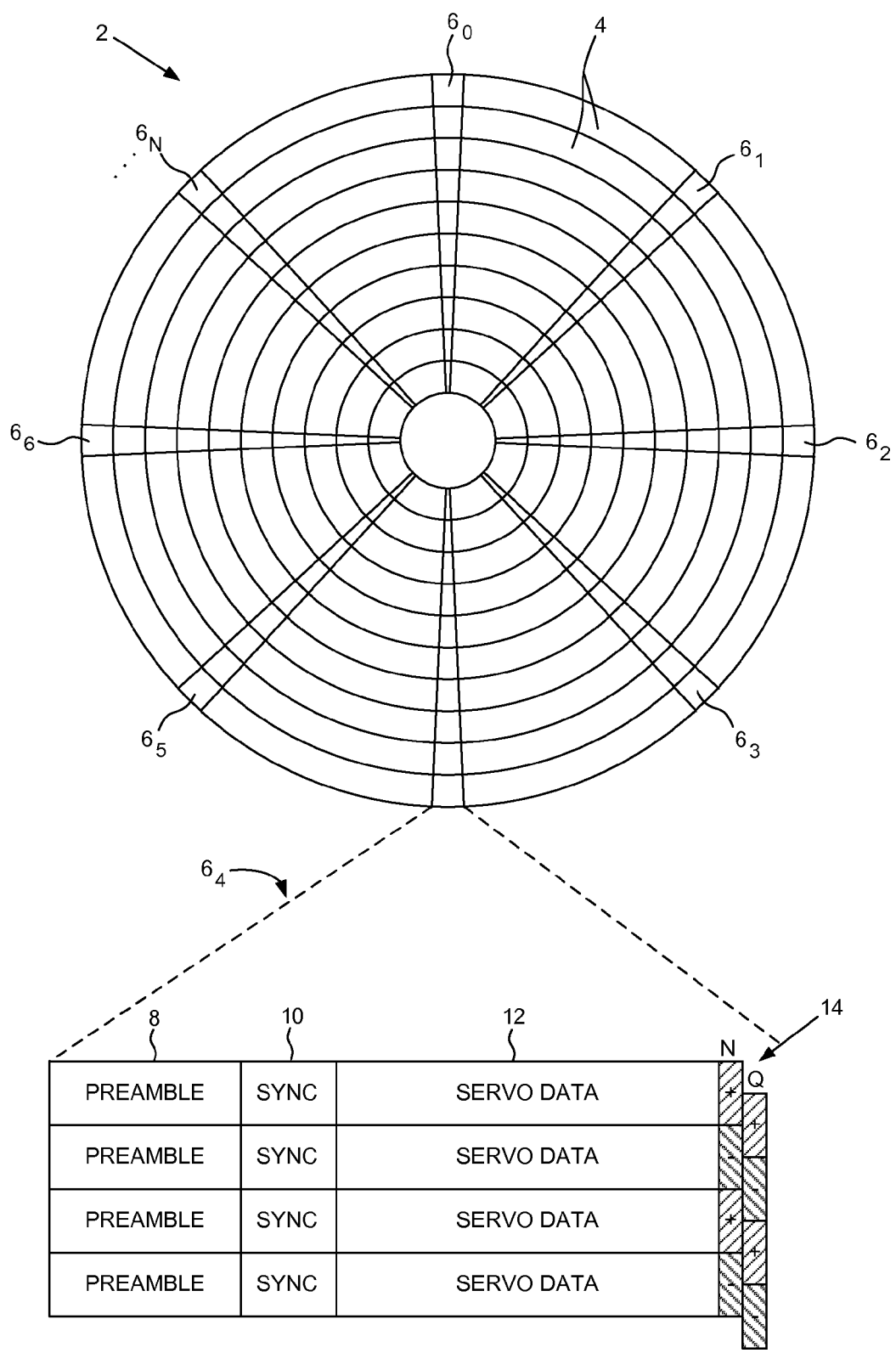
FIG. 1 shows a prior art disk format comprising a plurality of servo tracks defined by servo sectors.

FIG. 2A shows a data storage device in the form of a disk drive according to an embodiment comprising a head 16 actuated over a disk 18, wherein the head 16 (FIG. 2B) comprises a laser 20 configured to heat the disk 18 while writing data to the disk 18. The disk drive further comprises control circuitry 22 configured to execute the flow diagram of FIG. 2C, wherein a write power for the laser is calibrated and applied to the laser while writing user data to the disk (block 24). A calibration power is applied to the laser for a first interval, wherein the calibration power is high enough to cause the head to contact the disk if applied for a second interval longer than the first interval (block 26). While applying the calibration power to the laser, test data is written to the disk during at least part of the first interval (block 28). The test data is read from the disk to generate a read signal, and a metric is generated based on the read signal (block 30).

In the embodiment of FIG. 2B, the head 16 comprises a suitable write element 32 (e.g., an inductive coil), a suitable read element 34 (e.g., a magnetoresistive element), and a suitable fly height actuator (FHA) 36 configured to actuate the head 16 vertically over the disk 18. Any suitable FHA 36 may be employed, such as a heater that actuates through thermal expansion, or a piezoelectric actuator that actuates through mechanical deflection.

In the embodiment of FIG. 2A, servo sectors $38_0$-$38_N$ define a plurality of servo tracks 30, wherein data tracks are defined relative to the servo tracks at the same or different radial density. In an embodiment where the servo sectors $38_0$-$38_N$ are recorded at the same data rate, the servo sectors $38_0$-$38_N$ form servo wedges that extend radially across the disk 18 as shown in FIG. 2A. Other embodiments may employ zoned servo sectors wherein the data rate may vary across the radius of the disk, thereby forming servo wedges within each servo zone. The control circuitry 22 processes a read signal 40 emanating from the head 16 to demodulate the servo sectors $38_0$-$38_N$ and generate a position error signal (PES) representing an error between the actual position of the head and a target position relative to a target track. The control circuitry 22 filters the PES using a suitable compensation filter to generate a control signal 42 applied to a voice coil motor (VCM) 44 which rotates an actuator arm 46 about a pivot in order to actuate the head 16 radially over the disk 18 in a direction that reduces the PES. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern (e.g., as shown in FIG. 1).

In one embodiment, it may be desirable to calibrate one or more parameters that affect the quality of the recorded data, and the therefore the accuracy in recovering the recorded data. For example, in one embodiment the quality of the recorded data may depend on the fly height of the head 16 over the disk 18 when writing the data. The fly height may affect the efficacy of the laser 20 to heat the surface of the disk 18 while maintaining a target track width (and corresponding density) for the data tracks. Accordingly, in one embodiment a control signal applied to the FHA 36 (FIG. 2B) may be calibrated in order to achieve a target fly height during write operations. In some embodiments, certain environmental conditions, such as the ambient temperature, or other factors (such as degradation of the laser), may affect the fly height of the head 16 over time. In one embodiment, it may be desirable to detect when the fly height of the head 16 has deviated from the target fly height so that the control signal applied to the FHA may be adjusted and/or so that the write power for the laser may be adjusted.

Figure 3A:
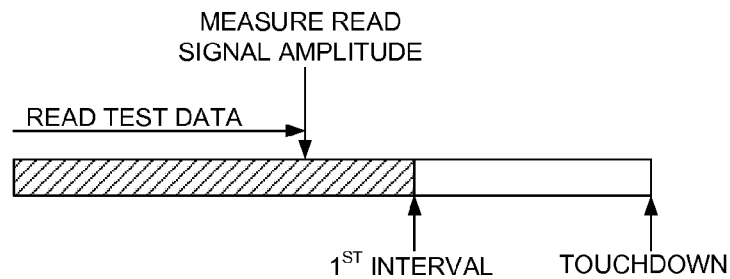
FIG. 3A illustrates an embodiment wherein test data is written to the disk while applying the calibration power to the laser during the first interval, wherein the head would eventually contact the disk if the calibration power were applied to the laser for a second interval longer than the first interval.

In one embodiment, a calibration power may be applied to the laser 20 during a calibration procedure, wherein during a first interval test data may be written to a target data track such as shown in FIG. 3A. At the end of the first interval, the writing of the test data terminates and the power applied to the laser is reduced in order to avoid the head 16 contacting the disk 18. That is, in one embodiment the calibration power applied to the laser 20 is high enough such that the thermal protrusion of the head components over time (i.e., for a second interval longer than the first interval) would eventually cause the head 16 to contact the disk 18 as illustrated in FIG. 3A. The test data is then read from the disk 18 to generate a suitable metric based on the read signal. For example, in one embodiment the metric may comprise the amplitude of the read signal after reading at least part of the test data as illustrated in FIG. 3A. In one embodiment, the process of writing/reading the test pattern may be repeated at different calibration power levels and a corresponding metric generated at each calibration power level. The resulting metrics may then be evaluated to calibrate a parameter of the disk drive, such as the control signal applied to the FHA 36 in order to maintain a target fly height of the head during write operations.

Figure 3B:
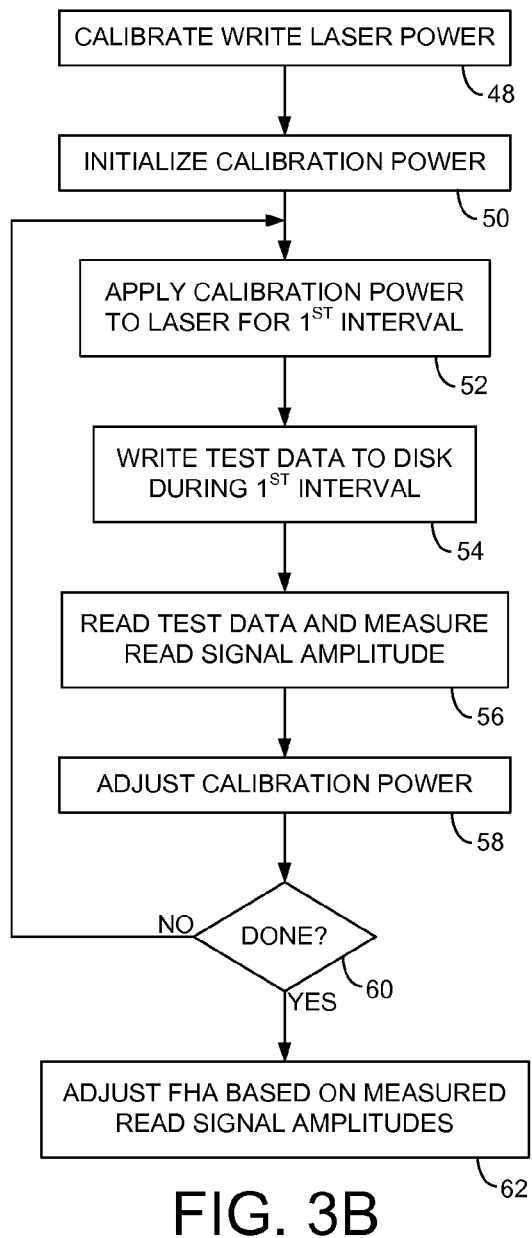
FIG. 3B is a flow diagram according to an embodiment wherein test data is written to and read form the disk over a number of different calibration powers to generate a plurality of metrics, and a control signal applied to the fly height actuator is adjusted based on the metrics.
Figure 4A:
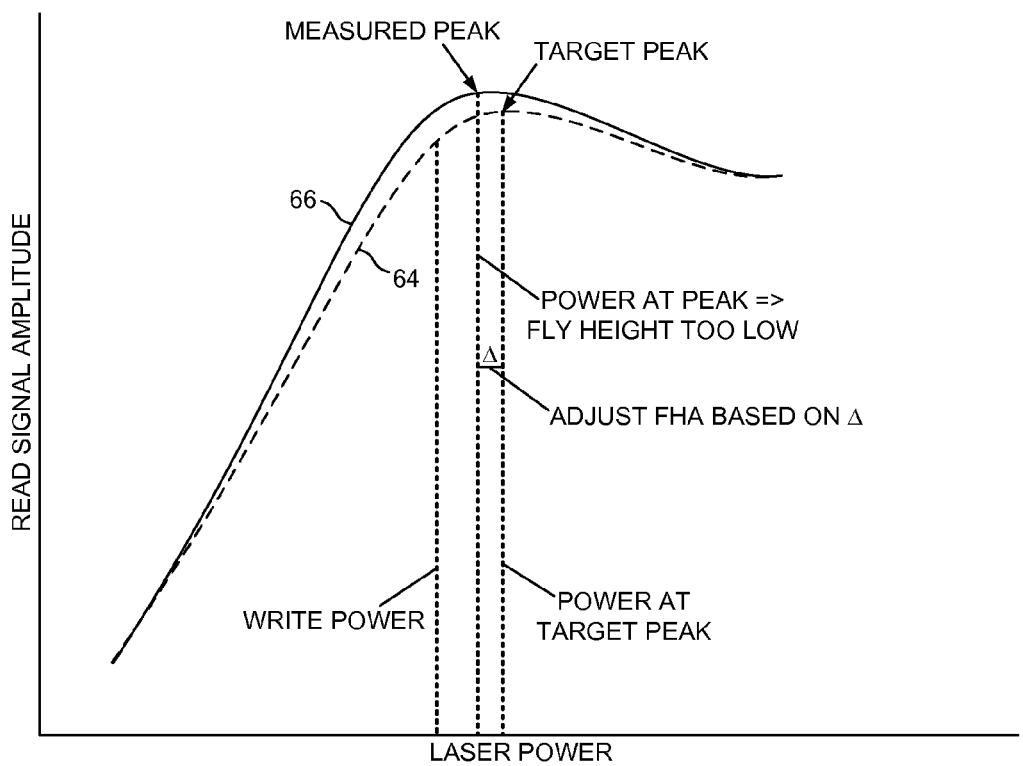
FIG. 4A illustrates an embodiment wherein the control signal applied to the fly height actuator is adjusted based on a difference between a measured peak in the metrics and a target peak.
Figure 4B:
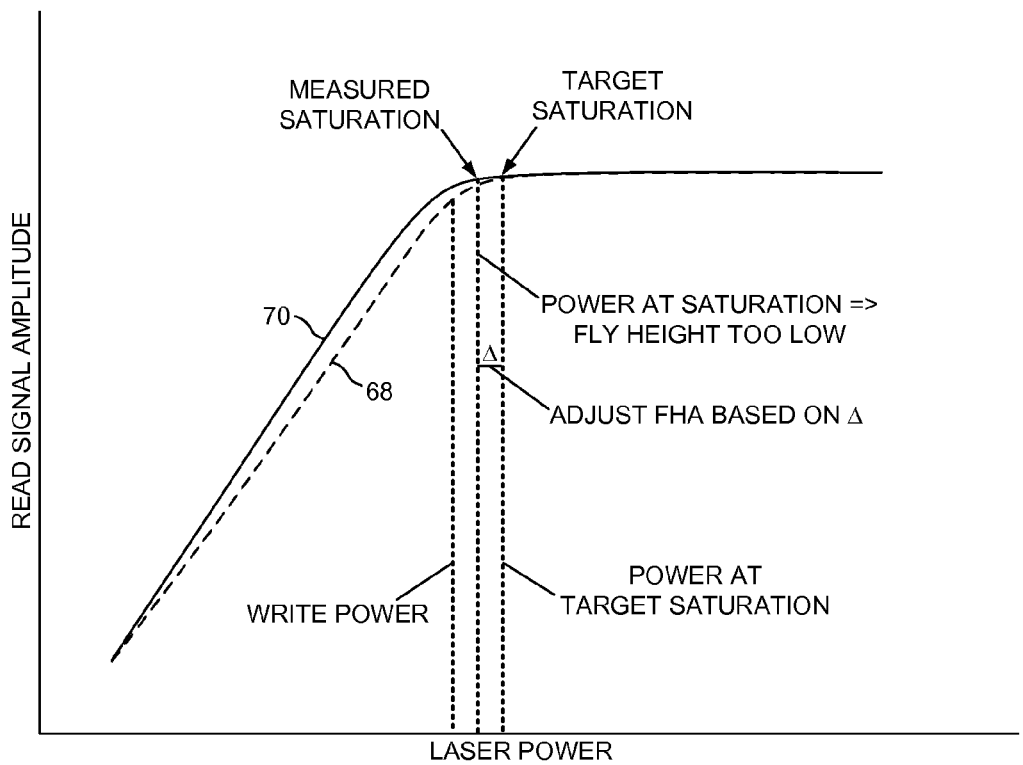
FIG. 4B illustrates an embodiment wherein the control signal applied to the fly height actuator is adjusted based on a difference between a measured saturation in the metrics and a target saturation.

An example of this embodiment is understood with reference to the flow diagram of FIG. 3B in view of the read signal amplitude waveforms shown in FIGS. 4A and 4B. After calibrating the write power for the laser (block 48), the calibration power for the laser is initialized to a value different than the write power, such as less than the write power (block 50). While applying the calibration power to the laser for a first interval (block 52), test data is written to the disk during at least part of a first interval (block 54). The test data is then read to generate a read signal, and the amplitude of the read signal after reading at least part of the test data is measured and saved (block 56). The calibration power is then adjusted (block 58), such as by increasing the calibration power, and the process is repeated from block 52 until a sufficient number of read signal amplitude measurements have been taken (block 60). The control signal applied to the FHA is then adjusted based on the saved read signal amplitudes (block 62).

Referring to the example shown in FIG. 4A, the dashed waveform 64 may represent the read signal amplitude described above measured by reading the test data from the disk written using different calibration power levels. When the calibration power applied to the laser is low, the read signal amplitude is low due to an undersaturation of the media. As the calibration power increases, the read signal amplitude increases, and as shown in the example embodiment of FIG. 4A, the read signal amplitude may eventually reach a peak at a calibration power that is greater than the write power for the laser (i.e., the write power calibrated for normal write operations). In the embodiment of FIG. 4A, the read signal amplitude begins to decrease as the calibration power applied to the laser is further increased. As the calibration power is increased past the write power, the calibration power will reach a level that will cause the head to contact the disk if applied to the laser for too long (past the first interval) as described above. Accordingly, in one embodiment the first interval is selected to ensure the head 16 will not contact the disk 18 while enabling the test data to be written at higher laser powers so that the desired metric (e.g., read signal amplitude) may be measured.

In one embodiment, at least part of the dashed waveform 64 shown in FIG. 4A may be generated by executing the flow diagram of FIG. 3B after calibrating the control signal applied to the FHA to achieve the target fly height as well as calibrating the write power for the laser. In this manner the peak in the dashed waveform 64 may correspond to a target inflection point when the head 16 is flying over the disk 18 at the target fly height during write operations. In one embodiment, the flow diagram of FIG. 3B may be re-executed periodically or reactively in order to verify that the head is still flying at the target fly height during write operations. For example, in some embodiments the control circuitry may react to a temperature sensor, or to a quality metric associated with the read signal, when deciding whether to re-execute the flow diagram of FIG. 3B. In one embodiment, the control circuitry may seek the head to a calibration track in order to re-execute the flow diagram of FIG. 3B so that previously recorded user data is not overwritten by the test data.

The solid waveform 66 in FIG. 4A shows an embodiment wherein the inflection point (measured peak in this example) that is generated after re-executing the flow diagram of FIG. 3B shifts left from the target inflection point (target peak in this example) due to the head flying too low. That is, the calibrated power corresponding to the measured peak in waveform 66 occurs at a lower power than the calibrated power corresponding to the target peak in waveform 64. In one embodiment, the difference in the calibration powers (i.e., the delta) may be processed in order to adjust the control signal applied to the FHA 36. Alternatively, the delta exceeding a threshold may trigger a recalibration of the control signal applied to the FHA 36 using any suitable technique.

In another embodiment, the amplitude of the read signal at the measured peak in the waveform 66 may deviate from the amplitude at the target peak in the target waveform 64 as shown in the example of FIG. 4A. Accordingly, in one embodiment the difference in the read signal amplitude at the measured peak relative to the target peak may be used to adjust the control signal applied to the FHA 36 or trigger a recalibration of the control signal.

FIG. 4B illustrates another embodiment wherein the read signal amplitude waveforms (e.g., target waveform 68 and deviant waveform 70) may exhibit an inflection point other than a peak. In this example, the inflection point comprises a saturation point of the read signal amplitude which may be measured in any suitable manner, such as by measuring when the slope of the read signal amplitude approaches zero. Accordingly in this embodiment the control signal applied to the FHA 36 may be adjusted, or a recalibration of the control signal triggered, based on the delta between the target saturation point and the measured saturation point after re-executing the flow diagram of FIG. 3B.

In one embodiment, the metric generated at block 30 of FIG. 2C may be used to adjust the write power for the laser, or may be used to trigger a recalibration of the write power using any suitable technique. That is, in one embodiment the deviation in the inflection point such as shown in the examples of FIGS. 4A and 4B may be compensated by adjusting the write power applied to the laser instead of, or in addition to, adjusting the control signal applied to the FHA 36. For example, if a change in the ambient temperature causes the head to deviate from the target fly height, it may be desirable to adjust the physical fly height of the head (by adjusting the control signal applied to the FHA 36) to maintain the target fly height as well as adjust the write power for the laser since the ambient temperature may also affect the output power of the laser. Accordingly, in one embodiment the control circuitry may be configured to adjust (or recalibrate) the write power for the laser after adjusting the control signal applied to the fly height actuator.

The metric generated at block 30 of FIG. 2C may be used for any suitable reason, such as to adjust the control signal applied to a FHA 36 and thereby adjust the fly height of the head 16 as described above. In one embodiment, one or more other parameters may be adjusted instead of, or in addition to, the control signal applied to the FHA 26. For example, the write current applied to the write element 32 (FIG. 2B) may affect the fly height of the head 16 and therefore in one embodiment the write current may be adjusted in response to the metric generated at block 30 of FIG. 2C. In yet another embodiment, the metric may be used to calibrate the write power for the laser 20 or the write current for the write element 32. In other embodiments, the metric generated at block 30 of FIG. 2C may be evaluated to characterize the performance of the laser 20 for quality control and/or to provide feedback to improve the fabrication process for the head 16.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a laser configured to heat the disk while writing data to the disk; and
   control circuitry configured to:
   (a) calibrate a write power for the laser, wherein the write power is applied to the laser while writing user data to the disk;
   (b) apply a calibration power to the laser for a first interval, wherein the calibration power is high enough to cause the head to contact the disk if applied for a second interval longer than the first interval;

(c) while applying the calibration power to the laser, write test data to the disk during at least part of the first interval; and (d) read the test data from the disk to generate a read signal and generate a metric based on the read signal.

2. The data storage device as recited in claim 1, wherein the data storage device further comprises a fly height actuator configured to actuate the head vertically over the disk, and the control circuitry is further configured to adjust a control signal applied to the fly height actuator based on the metric.

3. The data storage device as recited in claim 2, wherein the control circuitry is further configured to generate the metric as the amplitude of the read signal after reading at least part of the test data.

4. The data storage device as recited in claim 3, wherein the control circuitry is further configured to:

repeat blocks (b) through (d) for a plurality of different calibration powers; and adjust the control signal applied to the fly height actuator based on a measured inflection point in the metrics generated for the different calibration powers.

5. The data storage device as recited in claim 4, wherein the control circuitry is further configured to adjust the control signal applied to the fly height actuator based on a difference between the measured inflection point and a target inflection point.

6. The data storage device as recited in claim 5, wherein the control circuitry is further configured to calibrate the target inflection point by:

calibrating a write setting for the control signal applied to the fly height actuator; and while applying the write setting to the fly height actuator, repeating blocks (b) through (d) for a plurality of different calibration powers.

7. The data storage device as recited in claim 2, wherein the control circuitry is further configured to adjust the write power for the laser based on the metric.

8. A method of operating a data storage device, the method comprising:

(a) calibrating a write power for a laser of a head, wherein the write power is applied to the laser while writing user data to a disk;

(b) applying a calibration power to the laser for a first interval, wherein the calibration power is high enough to cause the head to contact the disk if applied for a second interval longer than the first interval;

(c) while applying the calibration power to the laser, writing test data to the disk during at least part of the first interval; and (d) reading the test data from the disk to generate a read signal and generate a metric based on the read signal.

9. The method as recited in claim 8, further comprising adjusting a control signal applied to a fly height actuator based on the metric, wherein the fly height actuator is configured to actuate the head vertically over the disk.

10. The method as recited in claim 9, further comprising generating the metric as the amplitude of the read signal after reading at least part of the test data.

11. The method as recited in claim 10, further comprising:

repeating blocks (b) through (d) for a plurality of different calibration powers; and adjusting the control signal applied to the fly height actuator based on a measured inflection point in the metrics generated for the different calibration powers.

12. The method as recited in claim 11, further comprising adjusting the control signal applied to the fly height actuator based on a difference between the measured inflection point and a target inflection point.

13. The method as recited in claim 12, further comprising calibrating the target inflection point by:

calibrating a write setting for the control signal applied to the fly height actuator; and while applying the write setting to the fly height actuator, repeating blocks (b) through (d) for a plurality of different calibration powers.

14. The method as recited in claim 9, further comprising adjusting the write power for the laser based on the metric.

* * * * *